United States Patent [19]
Wilson

[11] Patent Number: 5,206,775
[45] Date of Patent: Apr. 27, 1993

[54] CIRCUIT BYPASS DEVICE

[75] Inventor: Jean P. Wilson, Mountain View, Calif.

[73] Assignee: Space Systems/Loral, Inc., Palo Alto, Calif.

[21] Appl. No.: 704,772

[22] Filed: May 23, 1991

[51] Int. Cl.$^5$ .............................................. H02H 7/16
[52] U.S. Cl. ..................................... 361/15; 337/140; 320/40; 361/17
[58] Field of Search ....................... 361/15, 16, 17, 91; 320/18, 16, 17, 39, 40, 36; 337/140

[56] References Cited

U.S. PATENT DOCUMENTS

| | | | |
|---|---|---|---|
| 3,573,550 | 4/1971 | Baker | 317/16 |
| 3,957,329 | 5/1976 | McConnell | 361/16 |
| 4,028,592 | 6/1977 | Fahlen et al. | 361/16 |
| 4,303,877 | 12/1981 | Meinhold | 320/18 |
| 4,473,859 | 9/1984 | Stone et al. | 361/93 |
| 4,490,975 | 1/1985 | Yaeger et al. | 60/527 |
| 4,524,343 | 6/1985 | Morgan et al. | 337/140 |
| 4,559,512 | 12/1985 | Yaeger et al. | 337/140 |
| 4,700,259 | 10/1987 | Stokes | 361/103 |
| 4,797,649 | 1/1989 | Homma | 337/140 |
| 4,825,184 | 4/1989 | Bloch et al. | 336/20 |
| 4,922,364 | 5/1990 | Paulsson | 361/16 |

FOREIGN PATENT DOCUMENTS 672674 5/1979 U.S.S.R. .

OTHER PUBLICATIONS

HEDRB presentation by Hughes to U.S. Gov't. Dec. 13, 1989.

*Primary Examiner*—A. D. Pellinen
*Assistant Examiner*—C. Schultz
*Attorney, Agent, or Firm*—Dennis S. Fernandez; John S. Ferrell; Edward J. Radlo

[57] ABSTRACT

A circuit bypass device (30) having terminals (70, 80) is connected to contacts (70, 80) of a cell (20) to provide a conductive path (40) in response to voltage excursion therebetween. Device (30) includes: a conductive shunt (40), coupled to contacts (70, 80), that is movable from a normally non-conductive position to a conductive position between terminals (70, 80); a detector (50), coupled to conductive shunt (40), for sensing voltage excursion beyond specified limits between contacts (70, 80); and an actuator (60) having a heat-to-recover shape memory metal alloy that is formed to contract when detector (50) senses the voltage excursion, for moving conductive shunt (40) from the non-conductive position to the conductive position. The formed alloy is preferably spring-shape which contracts translationally and torsionally.

12 Claims, 3 Drawing Sheets

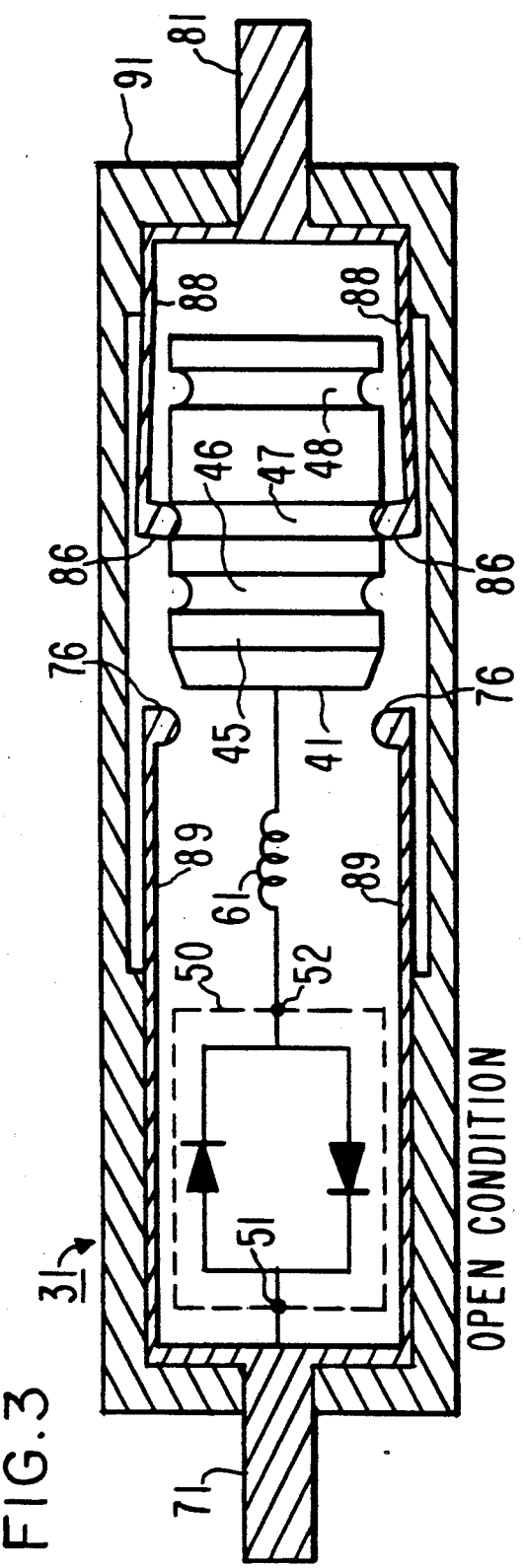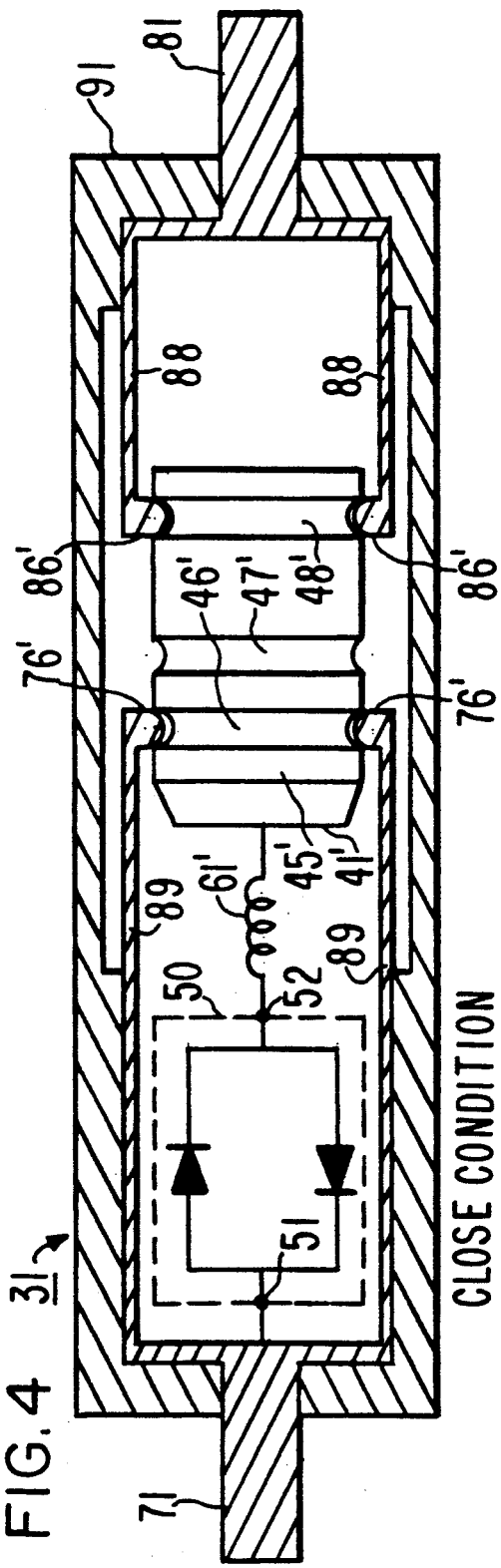

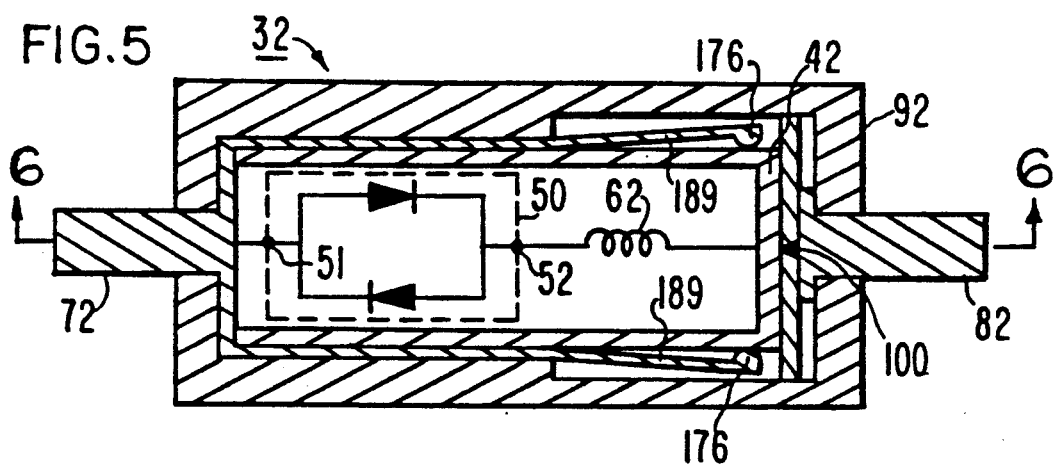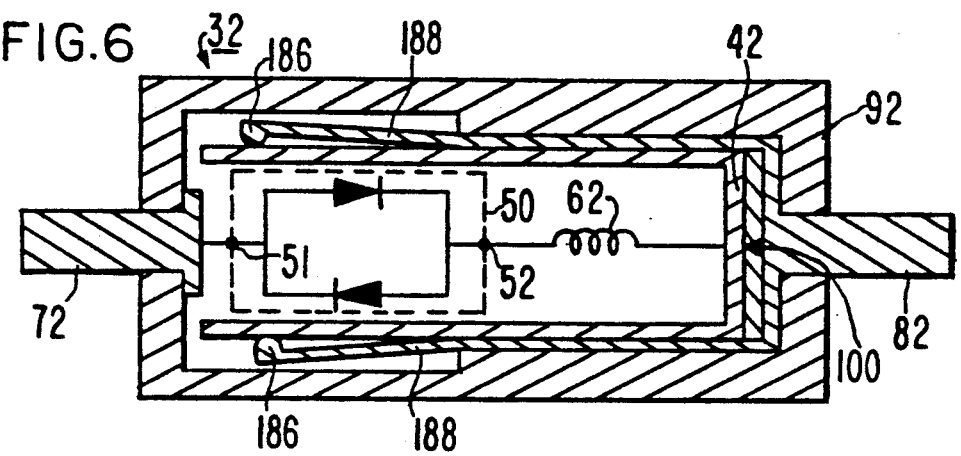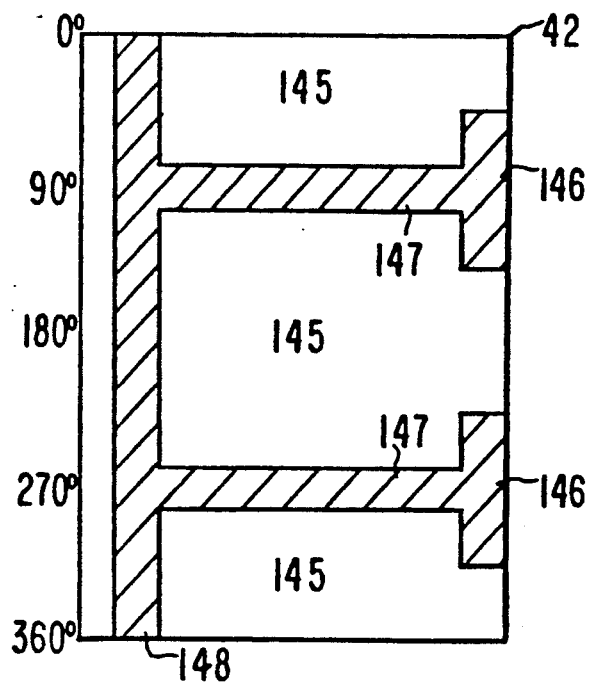

CIRCUIT BYPASS DEVICE

This is a subject invention under U.S. Government contract # NAS3-25082. As such the Government has rights therein.

TECHNICAL FIELD

This invention relates to electrical switches and particularly to those switches that provide conductive shunts across circuit terminals.

BACKGROUND ART

Unlike electrical fuses or circuit breakers electrical shunts provide a conductive path between terminals in a circuit. Typically shunts provide such paths upon the occurrence of certain triggering events. Shunts are useful for instance in bypassing faulty battery cells that are connected serially in power systems. In such systems, overall system failure can result from a single-cell failure. Such failure occurs when a cell becomes non-conductive due to an open circuit. To bypass the faulty cell a shunt switch is connected in parallel to the terminals of the cell. This connection permits current to flow around the cell. In space-borne systems, highly reliable shunt mechanisms for bypassing faulty cells are desirable. This is because power supplies are critical for operating such systems and any repair of the supplies is virtually impossible.

Previously electromechanical switches were employed to bypass faulty cells. These switches were spring-loaded and triggered by fuses. In addition other types of switches were used for non-bypassing applications. These other switches employed various forms of triggering mechanisms. In particular certain other switches were triggered by so-called heat-to-recover (HTR) shape memory metal alloy elements. HTR elements change shape in response to thermal increase. Such thermal increase may be induced by current flow through the element.

Switches that employ HTR elements however function as electrical fuses, not shunts. U.S. Pat. No. 4,700,259 to Stokes discloses an electrical circuit breaking device. The device breaks a conductor tensively in response to applied current. Soviet Union Patent No. 672674 to Korobov discloses a fuse. The fuse causes an open circuit by changing shape when heated. Current is applied to heat the fuse. U.S. Pat. No. 4,473,859 to Stone et al. discloses a piezoelectric circuit breaker with a bender. The bender responds to voltage changes by deflecting. The deflection then creates an open circuit.

U.S. Pat. No. 4,490,975 to Yaeger et al. discloses a self-protecting and conditioning memory metal actuator. The actuator uses a shape-memory spring that contracts due to temperature change. Current flow causes the temperature to change. U.S. Pat. No. 4,524,343 to Morgan et al. discloses a self-regulated spring which operates an actuator. The actuator functions in a circuit-breaking application. U.S. Pat. No. 4,825,184 to Bloch et al. discloses a current-controlled inductor. The inductor coil is made of shape memory alloy.

U.S. Pat. No. 3,573,550 to Baker discloses an automatically-resetting transient protection device. The device employs diodes connected to a power supply. The diodes serve to clamp the supply voltage at a certain level.

DISCLOSURE OF INVENTION

A circuit bypass device (30) having terminals (70, 80) is connected to contacts (70, 80) of a cell (20) to provide a conductive path (40) in response to voltage excursion therebetween. Device (30) comprises:

switching means (40), coupled to contacts (70, 80), having a conductive shunt (41, 42) that is movable from a normally non-conductive position to a conductive position between terminals (70, 80);

detecting means (50), coupled to switching means (40) and to contacts (70, 80), for sensing voltage excursion beyond a specified limit between contacts (70, 80); and actuating means (60) coupled to switching means (40), having a heat-to-recover shape memory metal alloy that is formed to contract in response to detecting means (50) sensing voltage excursion, for moving conductive shunt (41, 42) from the non-conductive position to the conductive position.

BRIEF DESCRIPTION OF THE DRAWINGS

FIGS. 3 and 4 are diagrams of a bypass device 31. Bypass device 31 is shown with an HTR element 61, 61'. HTR element 61, 61' contracts translationally to move a linear shunt 41, 41' from an open condition to a close condition. FIG. 3 shows the open condition, and FIG. 4 shows the close condition.

FIGS. 5 and 6 are diagrams of a bypass device 32. Device 32 in one diagram is shown rotatably offset by 90 degrees from device 32 as shown in the other diagram. Device 32 is configured with an HTR element 62. HTR element 62 contracts torsionally to move a rotational shunt 42 rotatably. This movement provides a conductive path between detents 176 and detents 186. Detents 176 are shown in FIG. 5, and detents 186 are shown in FIG. 6.

FIG. 7 shows a flattened view of the outer surface of rotational shunt 42. Angular displacements of rotational shunt 42 about line 6—6 of FIG. 5 are also shown.

BEST MODE OF CARRYING OUT THE INVENTION

Figure 1:
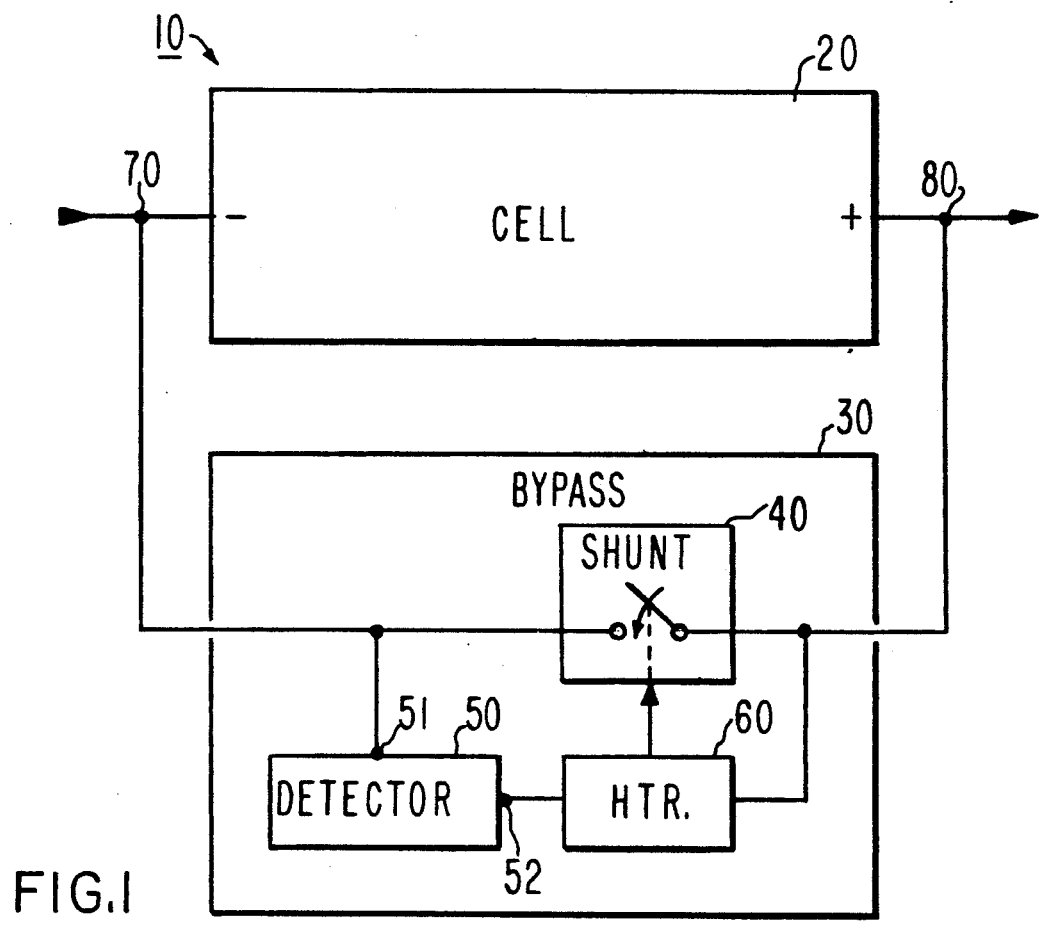
FIG. 1 is a block diagram of a battery system 10. System 10 is shown with a cell 20 and a bypass device 30 coupled at terminals 70, 80.

In FIG. 1 a block diagram shows a power supply or battery system 10. System 10 comprises a battery or a cell 20 and a circuit bypass device 30 which are coupled at electrical contacts or terminals 70, 80. Cell 20 is connected to system 10 with terminal 70 being designated negatively (−) and terminal 80 being designated positively (+). Cell 20 may be a single cell or a combination of multiple cells. Such multiple cells may be arranged serially or in parallel with each other.

Sometimes power supplies such as cell 20 are subject to electrical discontinuities or open circuit failures. Accordingly system 10 couples device 30 in parallel to cell 20. This coupling provides a conductive electrical switch or shunt 40 between terminals 70, 80. In the event of an open circuit failure in cell 20 a low-resistance bypass path is created between terminals 70, 80. Cell 20 may be manifested by any electrical circuit requiring uninterrupted conduction between two nodes in the circuit.

When device 30 is coupled initially to cell 20, shunt 40 is set open. Only negligible leakage current flows through diodes 53 and 54 as discussed later. Upon detection of an open circuit failure in cell 20, shunt 40 is triggered to switch selectively into a close position. Detection of the open circuit is accomplished by a detector 50. Detector 50 is coupled between terminals 70, 80 to sense the failures therebetween.

Figure 2:
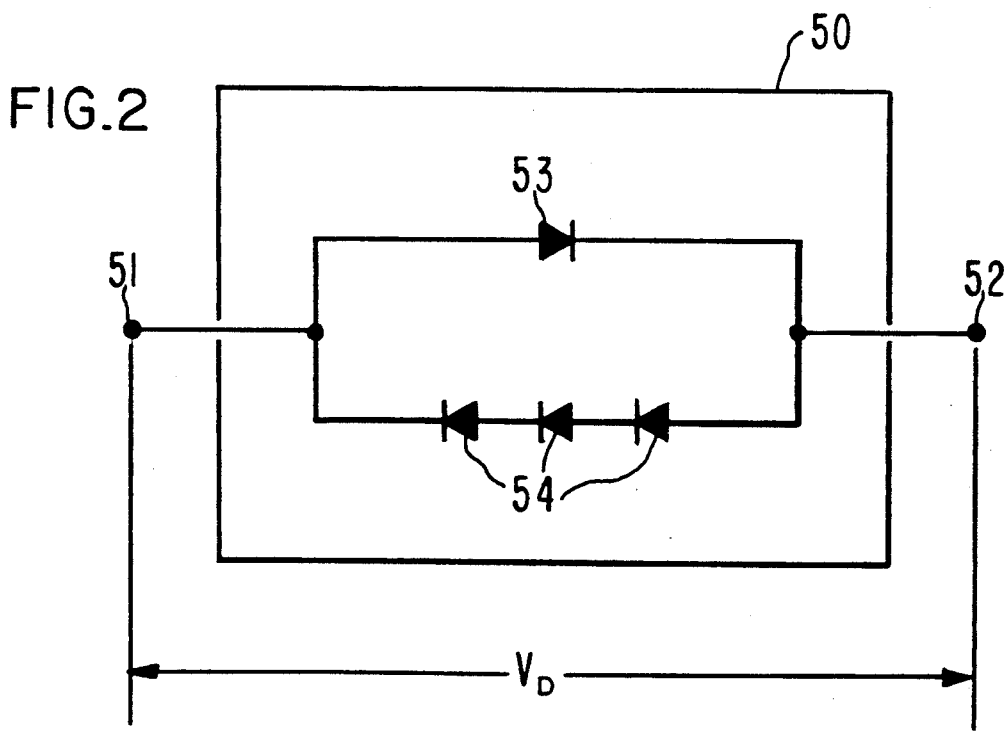
FIG. 2 is a schematic diagram of a detector 50. Detector 50 is included in bypass device 30 of FIG. 1.

Detector 50 is shown in FIG. 2. Detector 50 provides a conductive path between detector nodes 51, 52 when a voltage, $V_D$, applied between nodes 51, 52 exceeds specified limits. Detector 50 includes a plurality of diodes 53, 54. These diodes 53, 54 are arranged serially between nodes 51, 52. Node 51 is connected to terminal 70, and node 52 is connected to heat-to-recover element (HTR) 60. HTR 60 is connected to shunt 40, which is then connected to terminal 80.

The specified limits for $V_D$ vary depending on the direction of current flow through detector 50. In the charge direction from node 51 to node 52, current flows through single diode 53 when $V_D$ exceeds a 0.5 volt limit. This specified limit represents about one threshold drop. In the discharge direction from node 52 to node 51, current flows through three diodes 54 when $V_D$ exceeds a 1.5 volt limit. This specified limit represents about three threshold drops. Negligible leakage current through diodes 53, 54 flows between nodes 51, 52 when $V_D$ does not exceed the specified limits.

When the polarity of cell 20 is reversed, terminal 70 is designated positively (+) and terminal 80 is designated negatively (−). With these designations detector 50 is assembled with diodes 53, 54 connected in the reverse direction. In addition cell 20 may be assembled having a different number of diodes 53, 54. The accumulated threshold drops of diodes 53, 54 in a given direction correspond with the amount of $V_D$ that is anticipated to be applied to detector 50 in a given system 10. Moreover for most shunting applications, 1N3164-type diodes suffice as diodes 53, 54. The current ratings of the 1N3164-type diodes 53, 54 are based primarily on peak transient current rather than on continuous steady state current.

When system 10 is operating, an open circuit failure may occur in cell 20. If various external current sources or voltage sources are coupled to cell 20 through terminals 70, 80 the current or voltage from these external sources is applied to device 30 at terminals 70, 80. In particular the voltage that is applied externally at terminals 70, 80 is applied internally as well at nodes 51, 52 of detector 50. This internal voltage application is due to detector 50, HTR 60, and shunt 40 being connected serially. If the voltage applied at nodes 51, 52 exceeds specified $V_D$ limits, current flows through detector 50.

Current flowing through detector 50 also flows through HTR 60, shunt 40, and terminal 80. HTR 60 is made of heat-to-recover shape memory metal alloy. In accordance with an important aspect of the present invention, HTR 60 functions as an actuator to move shunt 40 into a conducting position between terminals 70, 80 in response to a voltage excursion detected therebetween.

If heated sufficiently by the electrical power dissipation of the current flowing through HTR 60, HTR 60 contracts to bias shunt 40 into a close position. Joule heating occurs as a function of $I^2R$, where I is the current in amperes flowing through HTR 60 and R is the resistance in ohms of HTR 60. Once shunt 40 is switched into a close position, a low-resistance, conductive path is formed between terminals 70, 80. Consequently voltage that is applied at nodes 51, 52 is reduced. Moreover $V_D$ returns to within the specified limits. This voltage reduction causes current flowing through detector 50 and HTR 60 to stop flowing.

HTR 60 is formed preferably into a spring shape. This shape permits translational and torsional contraction of the HTR 60 metal alloy. HTR 60 may also be formed into non-spring shapes that are linearly and rotationally stretchable. One type of non-spring shape is a so-called torque tube. A torque tube comprises an empty cylinder having diagonal slot openings disposed longitudinally along the cylinder surface. HTR 60 may also be assembled from a combination of multiple stretchable elements. Such multiple elements may be attached serially or in parallel to each other to improve the biasing of shunt 40. Non-stretchable shapes of HTR 60 exhibit lesser contraction in response to thermal increases.

The metal alloy of HTR 60 is capable of "remembering" its initially fabricated or pre-formed shape. When heated above a transformation temperature, $T_{M-A}$, the HTR 60 alloy transitions from a martensitic state to an austenitic state. When austenitic HTR 60 recovers its initial physical dimensions. While martensitic the HTR 60 alloy is characteristically soft and malleable. Thus an HTR 60 spring in the martensitic state stretches easily and does not apply significant translational or torsional force to bias shunt 40.

If sufficient current is passed through HTR 60 it becomes heated to temperatures above $T_{M-A}$. At these temperatures the HTR 60 alloy becomes austenitic. When austenitic the HTR 60 spring hardens and contracts to return to its unstretched, original dimensions. During this contraction considerable force is applied by HTR 60 to bias shunt 40 rapidly into a close switch position. Biasing is accomplished torsionally and translationally. Since current stops flowing through HTR 60 upon the closing of shunt 40, HTR 60 cools to a temperature below $T_{M-A}$. As a result of HTR 60 cooling, the force applied to bias shunt 40 becomes insignificant once again.

The HTR 60 alloy is composed primarily of nickel and titanium. One such alloy may be obtained from Raychem Corporation in a (45-52%) nickel, (35-40%) titanium, (10-15%) niobium composition. This composition includes about 1-2% of other constituents. Moreover for this composition, $T_{M-A}$ is approximately 175° C. However $T_{M-A}$ varies depending on the particular composition.

In summary three conductive paths are possible between terminals 70, 80. The first path is through cell 20. This path is available when cell 20 is functioning properly and not subject to an open circuit failure. However if an open circuit failure occurs in cell 20 then current flows through a second path. This path is through detector 50, HTR 60, and shunt 40. The second path is available only while $V_D$ exceeds specified limits and shunt 40 is set open. Finally once shunt 40 is switched into a close position, a third path is enabled through shunt 40.

Detector 50 may be triggered remotely. Remote triggering allows detector 50 to detect a false open circuit condition and permits cell 20 to be bypassed selectively even if cell 20 is non-faulty. This type of bypassing might be desirable to preempt an anticipated open circuit failure. Remote triggering is accomplished by applying a voltage to terminals 70, 80 or nodes 51, 52 in an amount which is sufficient to cause $V_D$ excursion outside the specified limits.

After device 30 is triggered to switch shunt 40 into a close position, device 30 may be reset to reopen shunt 40. This resetting is performed much like a conventional circuit breaker might be reset. To reset device 30, HTR 60 is cooled to a temperature sufficiently below a second transformation temperature, $T_{A-M}$. At $T_{A-M}$ the HTR 60 alloy transitions back to the martensitic state from the austenitic state. When HTR 60 is martensitic, shunt 40 is returned mechanically to its initial open position. Like $T_{M-A}$, $T_{A-M}$ varies with alloy composition. For the described Raychem alloy composition, $T_{A-M}$ is approximately $-30°$ C. Cooling is achieved by applying a coolant such as freon or liquid nitrogen directly onto HTR 60.

FIGS. 3 and 4 illustrate a bypass device 31 that is configured with a translationally contracting HTR 61, 61'. HTR 61 represents HTR element 60 in a stretched condition, and HTR 61' represents HTR element 60 in a contracted condition. In FIG. 3 device 31 is shown with a linear shunt 41 which is in an open condition. In FIG. 4 device 31 is shown with linear shunt 41, which is in a close condition. Terminals 71, 81 of device 31 are coupled respectively to terminals 70, 80 of cell 20. Device 31 is assembled in a case 91. Case 91 provides thermal insulation that is adequate to prevent transient external heat sources from raising the temperature therein to $T_{M-A}$.

Device 31 is assembled with terminal 71 connected to detector 50 at node 51. Detector 50 is also connected at node 52 to HTR 61. Shunt 41 and HTR 61 are connected as well. HTR 61 is stretched translationally between detector 50 and shunt 41. Since HTR 61 is martensitic when assembled initially in device 31, HTR 61 exerts insignificant force on shunt 41. Shunt 41 is connected to terminal 81 through detents 86 which hold shunt 41 in place at indentation 47. Detents 86 apply inward force to maintain electrical contact to shunt 41 through resilient prongs 88 extended from terminal 81.

When detector 50 senses an open circuit failure HTR 61 is caused by detector 50 to contract translationally. This contraction causes shunt 41' to be pulled into a close position as shown in FIG. 4. As shunt 41' is biased to move toward terminal 71, detents 86 are disengaged from indentation 47 and then re-engaged at indentation 48. Detents 76 are pushed toward terminal 81 to slide up ramp 45 on shunt 41'. When pushed beyond ramp 45, detents 76 become engaged at indentation 46. Detents 76 apply inward force to maintain electrical contact to shunt 41' through resilient prongs 89 extended from terminal 71.

Shunt 41, 41' is constructed of conductive material such as copper to provide low-resistance conduction between terminals 71, 81. To ensure that detents 76 are well-seated in indentations 46, ramp 45 is surface-coated with an electrical insulator such as fiberglass, ceramic, or polyimide. This insulation prevents detents 76 from engaging shunt 41' conductively before detents 76 are well-seated in indentations 46. In particular this insulation prevents HTR 61' from cooling prematurely and uncontracting before shunt 41' is switched completely into a close position.

In FIGS. 5 and 6 an alternative bypass device 32 is illustrated. Device 32 is configured with a torsionally-contracting HTR 62 and a contactor barrel or rotational shunt 42. Shunt 42 is movable torsionally to provide electrical conductivity between terminals 72, 82. In comparison to device 31, device 32 is potentially more compact since it does not require the additional longitudinal space that device 31 requires between terminals 71, 81. As described earlier such additional longitudinal space serves to permit translational movement of linear shunt 41.

In FIG. 5 terminal 72 is shown connected to detents 176 through resilient prongs 189. Prongs 189 apply inward force to maintain electrical contact against the outer surface of shunt 42. In FIG. 5 device 32 is shown rotatably offset by 90 degrees from device 32 shown in FIG. 6. Terminal 82 is also shown connected to detents 186 through resilient prongs 188. Similarly to prongs 189, prongs 188 apply inward force to maintain electrical contact against the outer surface of shunt 42. Terminals 72, 82 of device 32 are coupled respectively to terminals 70, 80 of cell 20. Device 32 is assembled in a case 92. Case 92 provides thermal insulation that is adequate to prevent transient external heat sources from raising the temperature therein to $T_{M-A}$.

Device 32 is assembled with terminal 72 connected to detector 50 at node 51. Detector 50 is also connected at node 52 to HTR 62. In addition HTR 62 is connected to shunt 42. Shunt 42 is shown in FIG. 7 in a flattened view. The view indicates angular displacements about line 6—6 as shown in FIG. 5. Shunt 42 is cylindrical and includes on its outer surface insulating sections 145 and conductive strips 146, 147, 148. Strips 146, 147, 148 are manufactured with conductive material such as copper. Sections 145 are manufactured with insulating material such as fiberglass, polyimide, or ceramic. Shunt 42 is mounted rotatably on a non-conducting pivot pin 100 coupled to terminal 82.

Strip 148 is wrapped continuously, i.e., 360 degrees, around the outer surface of shunt 42. Thus when shunt 42 rotates, detents 186 engage strip 148 continuously. Strips 147 connect strips 148, 146. Strips 146 are positioned discontinuously around the outer surface of shunt 42. Thus when shunt 42 rotates, electrical conductivity between terminals 72, 82 is provided when detents 176 conductively engage strips 146. However such conductivity is interrupted when detents 176 engage sections 145.

When device 32 is coupled initially to cell 20, HTR 62 is twisted or deformed torsionally between detector 50 and shunt 42. Since HTR 62 is martensitic when assembled initially in device 32, HTR 62 exerts insignificant force on shunt 42. Also shunt 42 is set open initially by aligning detents 176 not to engage strips 146 conductively. Indentations may be placed on the outer surface of shunt 42 coinciding with strips 146 and sections 145. These indentations permit detents 176 to engage shunt 42 more securely.

When detector 50 senses an open circuit failure, detector 50 causes HTR 62 to contract torsionally. This contraction applies a torsional force to shunt 42. As a result of this torsional force, shunt 42 is displaced angularly about line 6—6 as shown in FIG. 5. Furthermore this displacement aligns detents 176 and strips 146 to contact each other. Such contact serves to provide conduction between terminals 72, 82.

Additional strips 147, 146 may be interspersed on shunt 42. These additional strips 147, 146 provide more conduction points against which detents 176 may be aligned. Since additional strips 147, 146 reduce the angular displacement of shunt 42 that is necessary to provide conduction between strips 146 and detents 176, faster switching of device 32 is achieved.

I claim:

1. Apparatus having terminals for connection to a pair of contacts in a circuit to provide a conductive path in response to voltage excursion therebetween, the apparatus comprising:

switching means, coupled to the pair of contacts in the circuit, having a conductive shunt that is movable form a normally non-conductive position to a conductive position between the terminals;

detecting means, coupled to the switching means and to the pair of contacts, for sensing a voltage excursion beyond a specified limit between the contacts; and actuating means, coupled to the switching means, having a heat-to-recover shape memory metal alloy that is formed to contract in response to the detecting means sensing the voltage excursion, for moving the conductive shunt from the non-conductive position to the conductive position, wherein the heat-to-recover shape memory metal alloy is connected serially to the detecting means and the conductive shunt between the terminals such that current flows through such serial connection upon the sensing by the detecting means of the voltage excursion.

2. The apparatus in claim 1, wherein:
the switching means includes a pair of detents, coupled to each terminal, for contacting the conductive shunt to provide conductivity through the detents between the terminals when the conductive shunt is moved to the conductive position.

3. The apparatus in claim 2, wherein:
the switching means includes a pair of resilient prongs, coupled to each terminal and to each detent, for applying inward force to each detent to maintain contact between the detent and the conductive shunt.

4. The apparatus in claim 1, wherein:
the switching means includes insulation on the conductive shunt to insulate the shunt from conduction between the terminals when the shunt is in the non-conductive position.

5. The apparatus in claim 1, wherein:
the detecting means comprises a plurality of diodes coupled serially between the contacts to sense the voltage excursion therebetween, the diodes permitting current flow between the contacts in response to sensing the voltage excursion beyond the specified limit.

6. The apparatus in claim 1, wherein:
the formed alloy contracts translationally to move the switching means linearly.

7. The apparatus in claim 1, wherein:
the formed alloy contracts torsionally to move the switching means rotatably.

8. The apparatus in claim 1, wherein:
the formed alloy is composed of titanium and nickel.

9. The apparatus in claim 1, wherein:
the formed alloy is a spring shape.

10. The apparatus in claim 1, wherein,
the formed alloy is initially in a martensitic state.

11. The apparatus in claim 1, wherein:
the switching means, the detecting means, and the actuating means are assembled in a thermally-insulating case.

12. An improved system comprising:
a cell having a pair of contacts; and
a device having terminals coupled to the pair of contacts in the cell to bypass the cell conductively in response to voltage excursion between the contacts;

wherein the device includes:

switching means, coupled to the contacts, having a conductive shunt that is movable between a conductive position and a non-conductive position between the terminal;

detecting means, coupled to the switching means and to the contacts, for sensing a voltage excursion beyond a specified limit between the contacts; and actuating means, coupled to the switching means, having a heat-to-recover shape memory metal alloy that is formed to contract in response to the detecting means sensing the voltage excursions, for moving the conductive shunt from the non-conductive position to the conductive position, wherein the heat-to-recover shape memory metal alloy is connected serially to the detecting means and the conductive shunt between the terminals such that current flows through such serial connection upon the sensing by the detecting means of the voltage excursion.

* * * * *